May 2, 1967 W. J. MORRILL 3,317,124
MOTOR VIBRATION ISOLATING MOUNTING
Filed Nov. 19, 1964 3 Sheets-Sheet 1
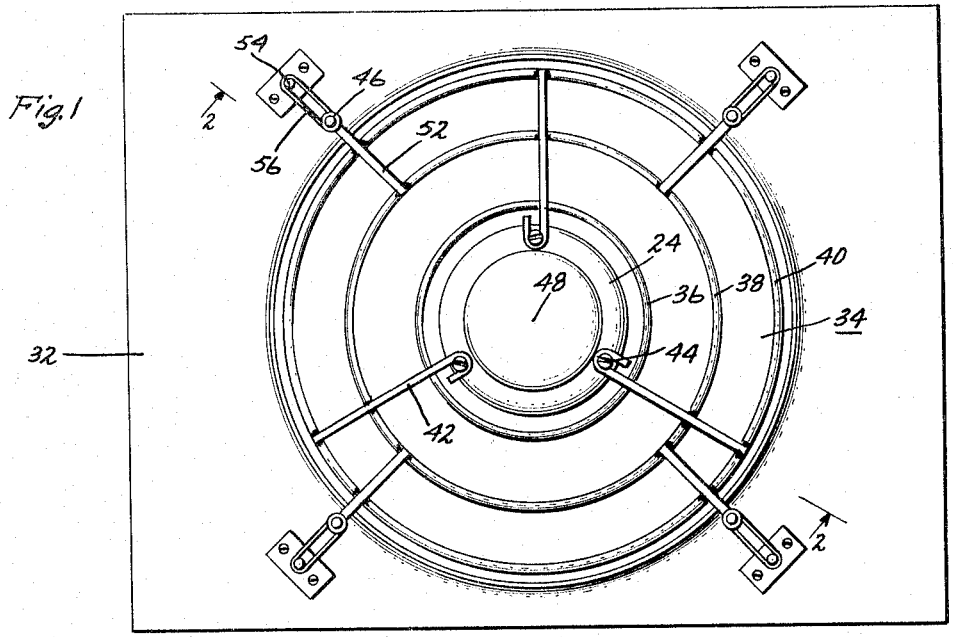
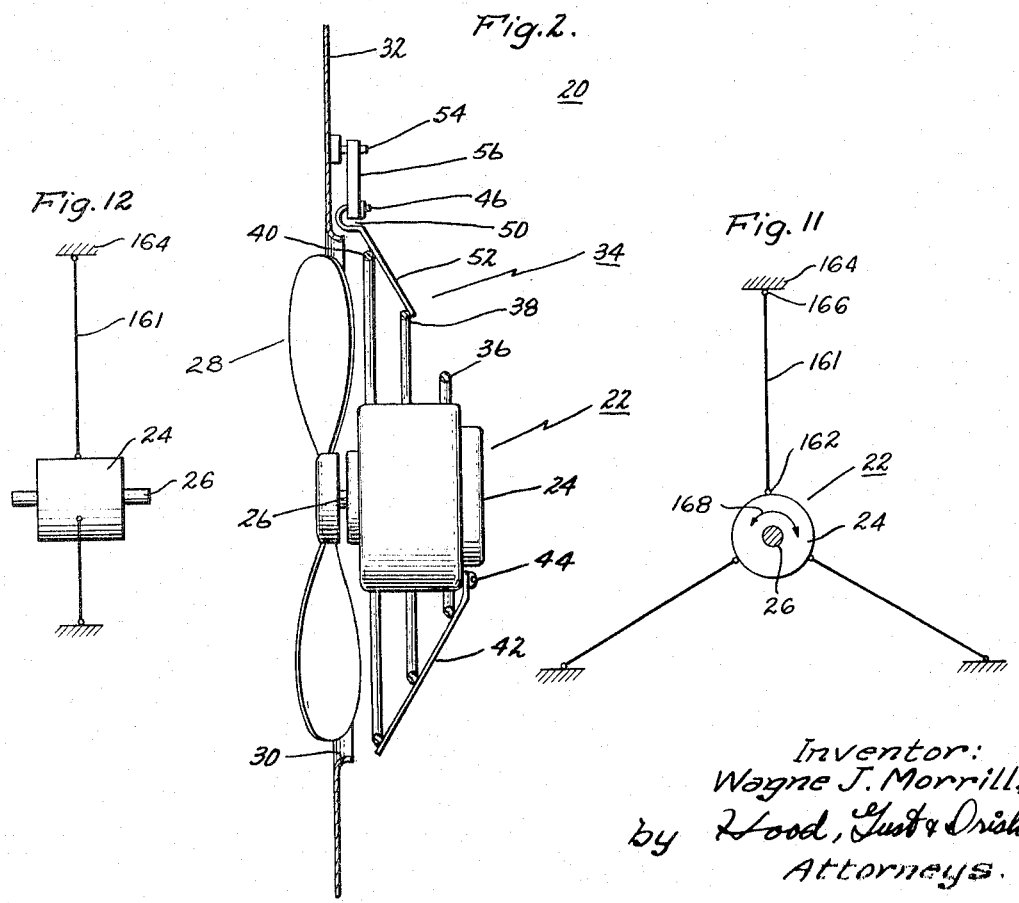
Inventor:
Wayne J. Morrill,
by Hood, Gust & Irish
Attorneys.

May 2, 1967  W. J. MORRILL  3,317,124
MOTOR VIBRATION ISOLATING MOUNTING
Filed Nov. 19, 1964  3 Sheets-Sheet 2
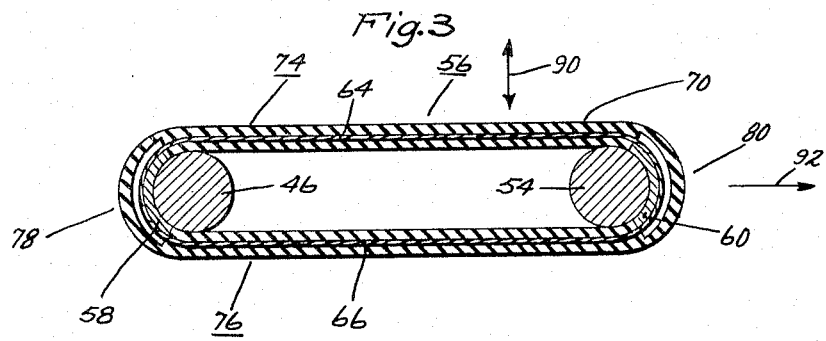
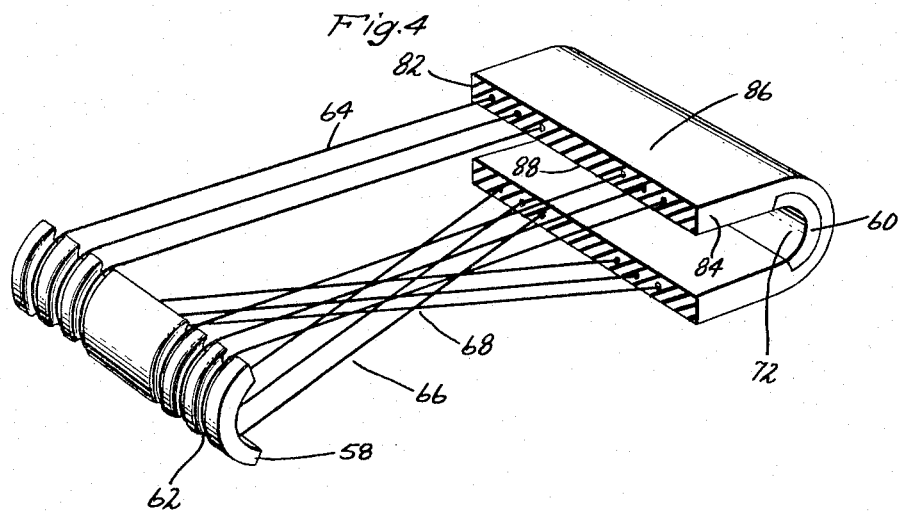
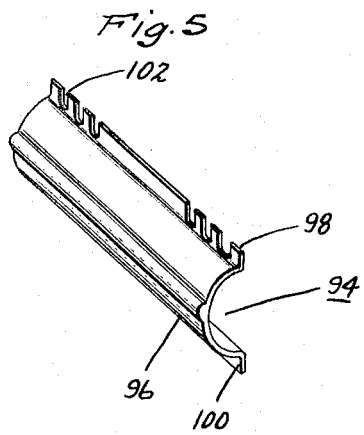
Inventor:
Wayne J. Morrill,
by Hood, Gust & Diehl
Attorneys.

May 2, 1967 W. J. MORRILL 3,317,124
MOTOR VIBRATION ISOLATING MOUNTING
Filed Nov. 19, 1964 3 Sheets-Sheet 3
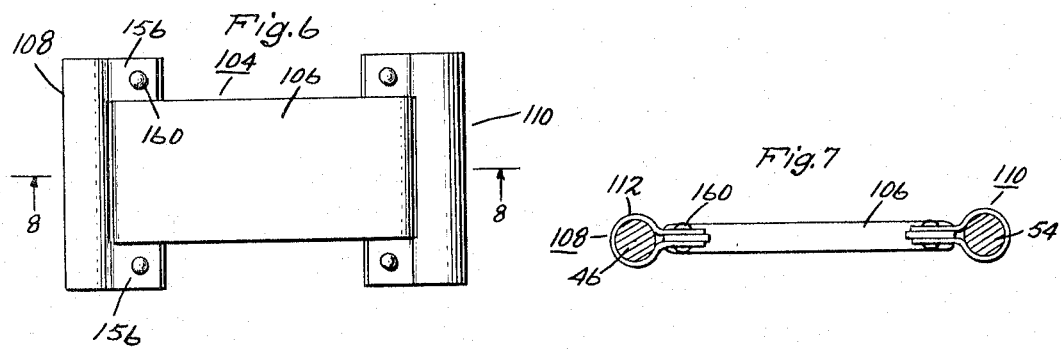
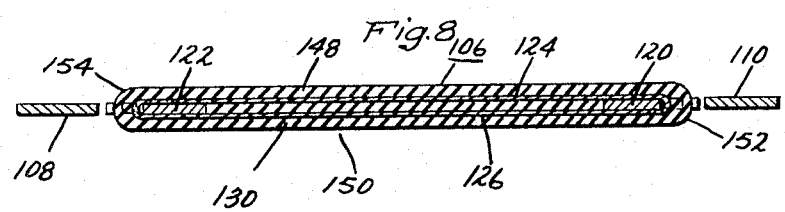
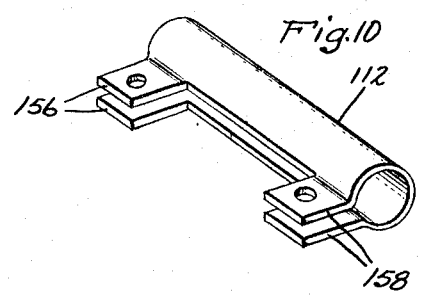
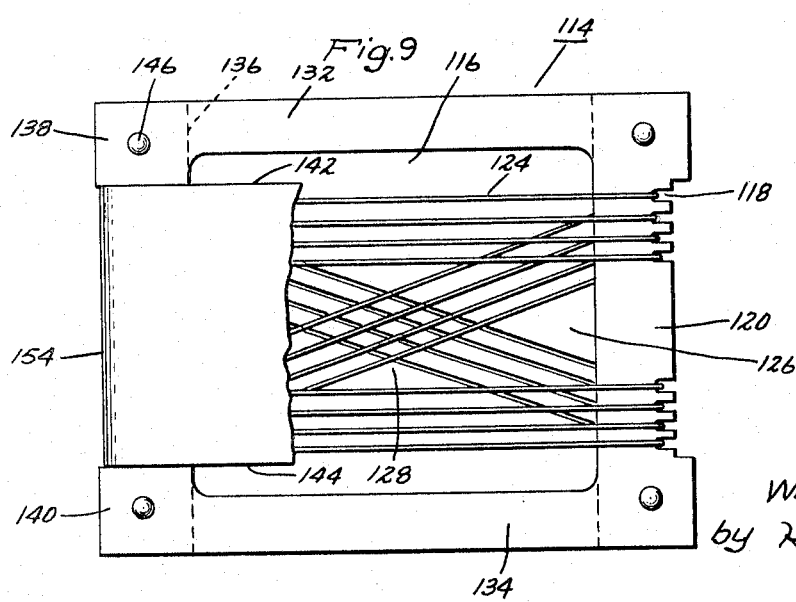
Inventor:
Wayne J. Morrill,
by Hood, Gust & Irish
Attorneys.

United States Patent Office 3,317,124
Patented May 2, 1967

---

3,317,124
MOTOR VIBRATION ISOLATING MOUNTING
Wayne J. Morrill, 3448 S. Washington Road,
Fort Wayne, Ind. 46804
Filed Nov. 19, 1964, Ser. No. 412,490
15 Claims. (Cl. 230—273)

This invention relates generally to mounting apparatus for isolating vibration of an electric motor, and more particularly to vibration isolating mounting apparatus for a motor-driven fan.

Conventional sixty-cycle single phase motors have a one hundred-twenty cycle rotational or torsional vibration. Eccentricity of driven apparatus directly connected to the motor shaft, such as a fan blade, contributes further rotational vibration. There are applications in which it is desirable to isolate such motor vibration from the apparatus upon which the motor is mounted, and numerous resilient mounting constructions have been employed to provide such vibration isolation. While many such resilient motor mounting arrangements are effective insofar as vibration isolation is concerned, they have nevertheless permitted considerable lateral and axial movement of the motor with respect to the supporting structure. There are instances, however, in which it is desirable closely to maintain the lateral and axial position of the axis of the motor shaft while still isolating the rotational vibration of the motor from the supporting structure; this is particularly true in the case of motor-driven fans in which the fan blade rotates within an orifice in a panel; in the case of such motor-driven fans, it is desirable accurately to define and maintain both the lateral and axial positions of the axis of rotation of the motor-fan mass in order to prevent bouncing of the motor and fan sufficiently to cause the fan to strike the sides of the orifice in which it rotates.

It is accordingly an object of the invention to provide mounting apparatus for isolating rotational vibrational and controlling axial vibration of a motor while closely maintaining the lateral and axial position of the axis of rotation of the motor.

Another object of the invention is to provide an improved vibration isolating mounting for a motor-driven fan.

In accordance with the broader aspects of the invention, a plurality of normally straight link members are provided respectively having one end connected to the stator member of the motor at angularly spaced intervals around the axis of rotation of the rotor member. The link members normally extend generally radially outwardly from the stator member and have their other ends connected to the structure upon which the motor is mounted. The link members are relatively flexible transversely but relatively stiff longitudinally and are in tension longitudinally. Thus, the requisite limited rotary freedom is provided for isolation of the rotational vibration of the motor while the lateral and axial position of the axis of rotation is accurately defined and maintained.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is an end view of a motor-driven fan incorporating one embodiment of the invention;

FIG. 2 is a cross-sectional view taken generally along the line 2—2 of FIG. 1;

FIG. 3 is a cross-sectional view of one of the link members of the embodiment of FIGS. 1 and 2;

FIG. 4 is a view in perspective, partly broken away, of the link member of FIG. 3;

FIG. 5 is a view in perspective showing another form of mounting element suitable for use in the link member of FIGS. 3 and 4;

FIG. 6 is a top view of another embodiment of the link member of the invention;

FIG. 7 is a side view of the link member of FIG. 6;

FIG. 8 is a side cross-sectional view taken along the line 8—8 of FIG. 6;

FIG. 9 is a fragmentary top view, partly broken away, further illustrating the link member of FIGS. 6, 7 and 8 and its method of fabrication;

FIG. 10 is a view in perspective further illustrating one of the yoke elements employed in the embodiment of FIGS. 6 through 9; and FIGS. 11 and 12 are diagrammatic illustrations useful in explaining the invention.

Referring now to FIGS. 1 and 2, there is shown a motor-driven fan assembly, generally indicated at 20, comprising a conventional single phase alternating current motor 22 having a stator member of frame 24, a rotor member (not shown), and a shaft 26 coaxially secured to the rotor member. A conventional air moving fan 28 is attached to motor shaft 26 and rotates within circular orifice 30 formed in panel 32 which may be conventionally formed of relatively thin sheet metal. A conventional wire fan guard 34 is provided comprising circular elements 36, 38, 40 and radially extending elements 42 which are secured to the stator member 24 in any suitable manner, as by screws 44, as shown.

It will be observed that in mounting motor 22 on panel 32 so that shaft 26 extends perpendicularly or normal to the plane of panel 32, it is desirable to isolate the rotational vibration of the motor-fan assembly 22, 28 from the panel 32 in order to minimize objectionable noise. It will further be observed that in order to prevent the blades of the fan 28 from striking the sides of the orifice 30, it is desirable accurately to define and maintain the lateral and axial position of the axis of rotation 48 of shaft 26. In order to accomplish these objectives, in the illustrated embodiment, four pins 46 are provided at equally angularly spaced positions about the axis of rotation 48 and extending parallel therewith; in the illustrated embodiment, pins 48, 46 are formed as hook portions 50 on the ends of radially extending wires 52 secured to the outer annular rings 38, 40 of fan guard 34, as shown, pins 46 extending away from panel 32, as best seen in FIG. 2. Four additional pins 54 are provided secured to panel 32 equally angularly disposed about the axis of orifice 30 and extending perpendicularly or normally to panel 32 in the same direction as pins 46, pins 54 being radially disposed outwardly from pins 46, as shown.

A plurality of elongated, normally straight link members 56 are provided connecting respective pairs of pins 46, 54, links 56 thus normally extending radially outwardly from axis 48. In the illustrated embodiment, links 56 take the form of elongated flat loops having their opposite ends engaging respective pins 46, 54. As will be hereinafter more fully described, the link members 56 are relatively flexible transversely and are relatively stiff longitudinally and when assembled on the pins 46, 54, are in tension longitudinally. The links 56 by virtue of being in tension and their relative longitudinal stiffness accurately define and maintain the lateral and axial position of the axis of rotation 48 of shaft 26 of motor 22 thus inhibiting bouncing of the motor-fan mass due to rotational and axial vibration of the motor which would occur if links 56 were longitudinally resilient, thus providing a mass-spring system. However, by virtue of their transverse flexibility, links 56 permit limited rotational movement of motor 22 and fan guard 34 about axis 48 of shaft 26 thus isolating the rotational vibration of motor 22 from the panel 32.

Referring now particularly to FIGS. 3 and 4, each of the loop members 56 shown in FIGS. 1 and 2 comprises a pair of arcuate mounting or bobbin elements 58, 60, respectively having grooves 62 formed in their outer surfaces, as shown. An elongated, preferably continuous, strand of relatively stiff material, preferably glass fibers, is wound around the mounting elements 58, 60, thus forming two spaced parallel layers 64, 66 of tension elements extending between mounting elements 58, 60. As best seen in FIG. 4, the tension elements of layer 64 extend longitudinally between the mounting elements 58, 60 in transversely spaced parallel relationship while the tension elements of layer 66 are divided into two groups of spaced parallel elements which extend diagonally between mounting elements 58, 60 and respectively cross intermediate the same, as at 68.

The layers 64, 66 of tension elements and the mounting elements 58, 60 are embedded in resilient material 70, preferably rubber-like material, the inner surfaces 72 of mounting elements 58, 60 which form bearing surfaces with pins 46, 54 being exposed, as shown. It will be seen that loop member 56 is thus provided with two elongated straight side portions 74, 76 and opposite generally arcuate ends 78, 80. Each of the side portions 74, 76 thus has opposite straight side edges 82, 84 and opposite flat sides 86, 88 defining the rectangular cross-section. It will further be seen that the two layers 64, 66 of tension elements are respectively embedded in the side portions 74, 76 approximately at their neutral axes. The two layers 64, 66 of tension elements are placed in tension when the loop 56 is assembled on the two pins 46, 54. While the layers 64, 66 of tension elements are preferably formed in a single continuous glass fiber strand, several strands may be employed. Further, while the inner surface of mounting elements 58, 60 are preferably exposed, they may also be coated with a thin layer of rubber.

Reference to FIGS. 1 and 2 will reveal that loop members 56 are installed with their flat sides 86, 88 of their side portions 74, 76 normally lying in planes perpendicular to the plane of panel 32. It will be seen that when thus installed, the two layers 64, 66 of glass fiber tension elements embedded in the coating 70 of rubber-like material to define parallel sides 74, 76 of the loop members 56 are relatively flexible transversely, as shown by arrows 90 in FIG. 3, but relatively stiff longitudinally as shown by arrow 92 in FIG. 3. Thus, the transverse flexibility of the tension elements 64, 66 and of their rubber coatings 70 permit transverse bending of the side portions 74, 76 of the loop members 56 in response to rotational movement of stator 24 about axis 48. Such rotational movement is very free for small rotational vibrations even though it is increasingly resisted as the rotational displacement increases by the relative longitudinal stiffness of the tension elements 64, 66 thereby providing isolation of the rotational vibration of the motor-fan mass 22, 28. However, while such limited rotational movement of stator 24 is accommodated, the relative stiffness of the tension elements 64, 66 and the fact that they are in tension accurately defines and maintains the lateral location of the axis of rotation 48 of shaft 26. The rotational vibration has a very small amplitude, i.e., only a few millionths of an inch in many cases, and seldom as much as a thousandth of an inch. Nevertheless, when transmitted to a suitable sounding board, the resulting airborne noise can be very objectionable. For this reason, a small amount of very flexible rotary freedom will isolate the rotational vibration.

In addition to isolation of rotational vibration and lateral location of the axis 48 of shaft 26, the diagonal crisscross arrangement of layer 66 of tension elements accurately defines and locates shaft 26 in the axial direction since any axial movement of the motor is resisted by a component of tension in one or the other of the groups of diagonal tension elements forming layer 66. In some instances, longitudinally extending tension elements may be omitted with all of the tension elements being diagonally extending.

It will be observed that the coating 70 of resilient material on the layers 64, 66 of tension elements is not employed primarily for its resilient properties, but rather to prevent the glass fiber strands from abraiding and in essence to knit the glass fibers into a cloth through the action of the resilient material. By locating the layers 64, 66 of tension elements approximately at the neutral axes of the parallel side portions 74, 76 of the loop members 56, which are analogous to flat resilient beams, it is seen that the only tension and compression which takes place in the resilient material is that on each side of the neutral axis as the beam bends. Further, by locating the tension elements approximately at the neutral axis of the parallel side portions, it is seen that these stiff tension members are placed principally in bending to which, because of the small diameter of the fibers, they are very flexible. Only the very flexible (in tension and compression) rubber-like material is placed in tension and compression on each side of the neutral axis, the result being great lateral flexibility and great longitudinal stiffness. It will thus be seen that the vibration isolation function and also the lateral and axial shaft location function is primarily performed by the fiberglass tension elements forming the layers 64, 66.

It will be understood that by definition, the "elasticity" of a body is its ability to return to its original size, and if it is a solid, to its original shape after being deformed. A stiff material like steel or glass may be just as elastic up to its elastic limit as a flexible material such as rubber. The most obvious differences between stiff material and a flexible material are the amount of deformation which can take place before the material takes a permanent set or ruptures and the amount of force required to produce the deformation. The amount of force required to produce a given deformation is defined as the modulus of elasticity, i.e., the ratio of stress to strain; the modulus of elasticity is the measure of stiffness. Glass as a material is very elastic, but has a high modulus of elasticity. Thus the glass fiber tension elements employed in the link members of the invention are very stiff longitudinally while very elastic longitudinally and in bending in the technical sense. As mentioned above, by reason of the provision of very small fibers, the tension elements are very flexible in bending.

In a specific embodiment of the invention for mounting a 1/150 horsepower shaded pole single-phase motor having a seven inch fan blade directly connected thereto, loop members 56 were provided having an overall length of 1.045 inches, an overall height of ½ inch, an overall width of .230 inch, and with the side portions 74, 76 being spaced apart by .150 inch, i.e., the diameter of the pins 46, 54. In this embodiment, the metal mounting elements 58, 60 were turned from brass and each had an arcuate span of 120°. The resilient material coating the tension elements and the mounting elements was fifty durometer neoprene and a glass fiber strand, .011 inch in diameter was employed for the tension elements 64, 66, the glass fiber elements being secured to the mounting elements 58, 60 with rubber cement.

Referring now to FIG. 5, a punched or stamped mounting element 94 is shown to replace the turned mounting elements 58, 60 of FIGS. 3 and 4. Mounting elements 94 is formed of relatively thin sheet metal, such as .01 inch steel, so as to have a generally semi-circular portion 96, the inner surface of which engages the respective pins 46, 54. Flange portions 98, 100 extend outwardly from the semi-circular portion 96 and have notches 102 punched therein for receiving and locating the tension elements 64, 66.

Referring now to FIGS. 6 through 10, another form of link members 104 is shown which may be used alternatively with the loop member 56 of the previous embodiment. Each link member 104 comprises an elongated transversely flexible and longitudinally relatively stiff tension element 106 having yoke members 108, 110 attached to its opposite ends, the yoke members 108, 110 having loop portions 112 which respectively embrace pins 46, 54.

In order to fabricate element 106, a generally rectangular grommet 114 is provided formed of suitable relatively thin sheet metal, such as .020 inch steel. Grommet 114 has an interior generally rectangular opening 116 and a plurality of notches 118 formed in its end legs 120, 122 which, as will be hereinafter described, ultimately function as mounting elements for element 106. An elongated continuous strand of relative stiff material, preferably glass fiber, is wound on the end legs 120, 122 with the opposite sides of the end legs thus forming the elongated strand into two spaced parallel layers 124, 126 of tension elements. It will be observed that as in the case of the embodiment of FIGS. 3 and 4, the tension elements of layer 124 extend longitudinally between the end legs 120, 122 in spaced parallel relationship, while the tension elements of layer 126 are divided into two groups of spaced parallel tension elements extending diagonally between end legs 120, 122 and respectively crossing intermediate the same, as at 128.

Following winding of the layers 124, 126 of tension elements on the grommet 114, a coating 130 of rubber-like resilient material is molded with the layers 124, 126 and the end legs 120, 122 being embedded therein, as best seen in FIG. 8. Side legs 132, 134 of the grommet 114 are then removed, as shown by dashed lines 136, thereby leaving portions 138, 140 projecting beyond the opposite side edges 142, 144 of the coating 130. These projecting portions 138, 140 respectively have mounting holes 146 formed therein, as shown.

It will now be seen that the element 106 takes the form of an elongated flat generally rectangular beam having opposite side edges 142, 144, opposite flat sides 148, 150 and opposite ends 152, 154 with the end legs 120, 122, which with their projecting portions 138, 140 form the mounting elements, being molded in the element 106 adjacent ends 152, 154.

Yoke members 108, 110 are respectively provided with end portions 156, 158 which embrace projecting portions 138, 140 of the end legs 120, 122 and are secured thereto, as by rivets 160. End portions 156, 158 are joined by arcuate loop portion 112, the loop portions 112 of the two yoke members 108, 110 embracingly receiving the respective pair of pins 46, 54, as best seen in FIG. 7.

As in the case of the previous embodiment, the link members 104 are connected to respective pairs of pins 46, 54 on the fan guard 34 and the panel 32 with their flat sides 148, 150 normally perpendicular to the plane of panel 32 and when so connected, the tension elements forming layers 124, 126 are in tension. It is thus seen that in this embodiment, each link member 104 comprises a single flat beam-like element 106 which is flexible transversely and relatively stiff longitudinally, the two layers 124, 126 of tension elements functioning in the same manner as the layers 64, 66 of the embodiment of FIGS. 3 and 4 to isolate rotational vibration of the motor-fan mass 22, 28 while accurately defining and locating the lateral and axial position of the motor shaft 26. It will again be seen that the tension elements forming the layers 124, 126 primarily provide the vibration isolation and lateral and axial shaft locating functions with the coating 130 of resilient material in which the tension elements are embedded preventing abraiding of the tension elements. Further, it will be seen that the layers 124, 126 of tension elements are positioned adjacent the neutral axis of the flat beam elements 106 so that the only tension and compression which takes place in the resilient material is at each side of the neutral axis as the beam bends. Further, it will be seen that the diagonal and crisscross arrangement of the tension elements of layer 128 prevents axial vibration and accurately defines and maintains the shaft location in the axial direction.

In a specific embodiment, beam elements 106 of the link members 104 have an overall length of 1.100 inches, a thickness of .070 inch with the tension elements being .011 inch diameter glass fibers and the coating 130 being 50 durometer neoprene. Again, the glass fiber tension elements are secured to the mounting elements 120, 122 with rubber cement.

Referring briefly to FIGS. 11 and 12, it will be comprehended that the invention is not restricted to vibration isolation of a motor-driven fan nor to employment of four equally angularly spaced and radially extending link members as in the embodiment of FIGS. 1 and 2. Thus, in a simple form, three elongated link members 161 may be provided respectively having one end connected to stator 24 of motor 22 preferably at equally angularly spaced intervals about the axis of shaft 26, as at 162, and having their other ends connected to mounting means 164, as at 166, the link members 161 normally extending generally radially outwardly from the axis of shaft 26. With the link members 160 being transversely flexible and relatively stiff longitudinally, limited rotational movement of stator 24 about the axis 26 is permitted, as shown by arrows 168 in FIG. 11, the longitudinally stiff properties of the tension link members 161 nevertheless accurately locating and defining the lateral position of the axis of shaft 26. It will be seen that it is not necessary that the links be equally angularly spaced, but they should be symmetrically spaced. It will also be seen that while at least three link members are preferably provided, in some cases two diametrically opposite link members would suffice.

While there have been described above the principles of this invention in connection with specific apparatus, it is to be clearly understood that this description is made only by way of example and not as a limitation to the scope of the invention.

What is claimed is:

1. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; at least three elongated normally straight flat beam members each having a generally rectangular cross-section and opposite ends; each of said beam members comprising a pair of elongated, flat, longitudinally spaced metal mounting elements at said opposite ends respectively, an elongated strand of relatively longitudinally stiff material wound on said mounting elements thereby to form a plurality of reinforcing tension elements extending between said mounting elements, and a body of rubber-like material having said tension elements embedded therein; first means for respectively connecting one mounting element of said beam members to said stator member at symmetrically spaced annular positions around said axis with said one mounting element of each beam member extending parallel with said axis; said second means for respectively connecting the other mounting element of said beam members to said mounting means with said other mounting elements extending perpendicularly to the plane of said mounting means, said beam members normally extending generally radially between respective first and second connecting means in planes normal to the plane of said mounting means and with said tension elements being in tension whereby said beam members are relatively flexible transversely and relatively stiff longitudinally thereby resisting lateral and axial movement of said stator member.

2. The apparatus of claim 1 wherein said mounting elements have opposite end portions respectively projecting beyond side edges of said beam members; wherein said first connecting means comprises a plurality of first pins secured to said stator member and extending parallel to said axis and a plurality of first metal yoke elements each having opposite end portions respectively secured to the end portions of the respective one mounting element, said first yoke elements respectively having loop portions joining the end portions thereof and respectively embracing said first pins; and wherein said second connecting means comprises a plurality of second pins secured to said mounting means and extending perpendicularly thereto, and a plurality of second metal yoke elements each having opposite end portions respectively secured to the end portions of the respective other mounting element, said second yoke elements respectively having loop portions joining the end portions thereof and respectively embracing said second pins.

3. The apparatus of claim 1 wherein the opposite sides of said mounting elements of each of said beam members form said tension elements into two spaced parallel layers, the tension elements of one of said layers extending longitudinally between said mounting elements in spaced parallel relationship, the tension elements of the other of said layers being divided into two groups, said groups extending diagonally between said mounting elements in spaced parallel relationship and respectively crossing intermediate said mounting elements, said layers being embodied in said body approximately at the neutral axis thereof.

4. Mounting apparatus for isolating rotational vibration of motor including a stator member and a rotor member, while closely maintaining the lateral and axial position of the axis of rotation of said rotor member comprising: stationary mounting means disposed in a plane normal to said axis and surrounding the same; at least three elongated normally straight, flat beam members each having parallel opposite ends, parallel opposite edges and flat opposite sides forming a rectangular cross section; each of said beam members comprising a pair of elongated flat metal mounting elements at said opposite ends, respectively, an elongated glass fiber strand wound on said mounting elements extending therebetween to form a plurality of tension elements, the opposite sides of said mounting elements forming said tension elements into two spaced parallel layers, the tension elements of one of said layers extending longitudinally between said mounting elements in spaced parallel relationship, the tension elements of the other layer being divided into two groups which extend diagonally between said mounting elements in spaced parallel relationship and respectively crossing intermediate the same, and a body of rubber-like material having said mounting elements and tension elements embedded therein, said tension element layers being parallel with said flat sides and approximately at the neutral axis of said beam member, each of said mounting elements having opposite end portions respectively projecting beyond said opposite edges of said beam member; a plurality of first pins secured to said stator member in symmetrically spaced relationship about said axis and extending parallel therewith; a plurality of first metal yoke elements each having opposite end portions respectively secured to the end portions of a respective one of said mounting elements at one end of said beam members, said first yoke elements respectively having loop portions joining the end portions thereof and respectively embracing said first pins; a plurality of second pins secured to said mounting means in symmetrically spaced relationship about an axis and extending perpendicularly to the plane of said mounting means; and a plurality of second metal yoke elements each having opposite end portions respectively secured to the end portions of a respective one of said mounting elements at the other end of said beam members, said second yoke members respectively having loop portions joining the end portions thereof and respectively embracing said second pins; said beam members respectively normally extending generally radially between respective first and second pins with their said flat sides lying in planes normal to the plane of said mounting means and with said tension elements being in tension whereby said beam members are relatively flexible transversely and relatively stiff longitudinally thereby resisting lateral and axial movement of said stator member.

5. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; and at least three elongated loop members each having spaced parallel side portions and generally arcuate opposite ends, said side portions having a generally rectangular cross-section, said loop members respectively having one end connected to said stator member at symmetrically spaced intervals about said axis and normally extending generally radially outwardly therefrom, said loop members having their other ends connected to said mounting means, said side portions lying in planes normal to the plane of said mounting means, at least said side portions of said loop members being formed of rubber-like material and being relatively flexible transversely, each of said side portions having a plurality of elongated strand-like reinforcing tension elements embedded therein and extending between said opposite ends, said elements being formed of relatively longitudinally stiff material and being in tension whereby said loop members are relatively stiff longitudinally thereby resisting lateral and axial movement of said stator member.

6. The apparatus of claim 5 wherein said tension elements extend longitudinally in parallel relationship in one side portion of each of said loop members, and wherein the tension elements of the other side portion of each of said loop members are divided into two groups, said groups respectively extending diagonally in parallel relationship between said opposite ends and respectively crossing intermediate said opposite ends.

7. The apparatus of claim 5 further comprising a plurality of first pins secured to said stator member in equally angularly spaced relationship about said axis and parallel therewith; and a plurality of second pins secured to said mounting means in equally angularly spaced relationship about an axis and extending perpendicularly to the plane of said mounting means; and wherein each of said loop members engages respective first and second pins thereby connecting said loop members to said stator member and mounting means.

8. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; at least three elongated loop members each having spaced parallel side portions and generally arcuate parallel opposite ends, said side portions having parallel opposite edges and flat opposite sides forming a rectangular cross section; each of said loop members comprising a pair of elongated generally arcuate metal mounting elements at said opposite ends, respectively, an elongated strand of relatively longitudinally stiff material wound of said mounting elements thereby to form a plurality of reinforcing tension elements extending between said mounting elements in two spaced parallel layers, and a body of rubber-like material having said tension elements and mounting elements embedded therein, said mounting elements forming said side portions, each of said side portions having one of said layers of tension elements embedded therein; a plurality of first pins secured to said stator member in symmetrically spaced relationship about said axis and parallel therewith; a plurality of second pins secured to said mounting means in symmetrically spaced relationship about an axis and extending perpendicularly to the plane of said mounting means; each of said loop members normally extending generally radially between respective first and second pins with their mounting elements respectively engaging the same, said loop members having said flat sides lying in planes normal to the plane of said mounting means and having said tension elements in tension whereby said loop members are relatively flexible transversely and relatively longitudinally stiff thereby resisting lateral and axial movement of said stator member.

9. The apparatus of claim 8 wherein said strand is a continuous length of fiber glass, wherein the tension elements of one of said layers of each loop member extend longitudinally between said ends in spaced parallel relationship, and wherein the tension elements of the other of said layers of each loop member are divided into two groups, said groups extending diagonally in spaced parallel relationship between said ends and respectively crossing intermediate said ends.

10. In a motor driven fan including a panel having a circular orifice therein, a motor having stator and rotor members, a fan directly connected to said rotor element and coaxial therewith for moving air through said orifice, and a wire fan guard secured to said stator member and extending radially outwardly therefrom; the combination with said fan guard and panel of vibration isolating mounting means for said motor and fan comprising at least three first pins on said fan guard at equally symmetrically spaced intervals about the axis of said rotor member and fan and extending parallel therewith; an equal number of second pins on said panel at symmetrically spaced intervals about the axis of said orifice and extending normal to the plane of said panel; and a plurality of elongated normally straight link members connecting respective first and second pins and extending generally radially therebetween, said link members being relatively flexible transversely and relatively stiff longitudinally, said link members being in tension longitudinally thereby resisting lateral and axial movement of said motor and fan.

11. The combination of claim 10 wherein each of said link members comprises a flat beam having opposite ends, each beam being formed of rubber-like material and having a plurality of elongated strand-like reinforcing tension elements embedded therein and extending between said opposite ends, and means for connecting said opposite ends of each of said beams to respective first and second pins, said beams lying in planes normal to the plane of said panel, said elements being formed of relatively longitudinally stiff material and being in tension.

12. The combination of claim 10 wherein each of said link members comprises an elongatd loop member having spaced parallel side portions and arcuate opposite ends, said side portions having a generally rectangular cross-section, said opposite ends of each of said loop members engaging respective first and second pins, said side portions lying in planes normal to the plane of said panel, at least said side portions of each of said loop members being formed of rubber-like material, each of said side portions having a plurality of elongated strand-like reinforcing tension elements embedded therein and extending between said opposite ends, said elements being formed of relatively longitudinally stiff material and being in tension.

13. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; and a plurality of elongated normally straight link members respectively having one end connected to said stator member at symmetrically spaced intervals around said axis and normally extending generally radially outwardly therefrom, said link members having their other ends connected to said mounting means, said link members being relatively flexible transversely and relatively stiff longitudinally, said link members being in tension longitudinally thereby resisting lateral and axial movement of said stator member, each of said link members comprising a plurality of elongated strand-like elements formed of relatively longitudinally stiff material, some of said elements being parallel with each other and with the plane of said mounting means from one end of the respective link member to the other, the remainder of said elements extending diagonally from one end of the respective link member to the other and crossing intermediate said ends, all of said elements being in tension.

14. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; and a plurality of elongated normally straight link members respectively having one end connected to said stator member at symmetrically spaced intervals around said axis and normally extending generally radially outwardly therefrom, said link members having their other ends connected to said mounting means, said link members being relatively flexible transversely and relatively stiff longitudinally, said link members being in tension longitudinally thereby resisting lateral and axial movement of said stator member, each of said link members comprising two layers of elongated strand-like elements formed of relatively longitudinally stiff material, said layers normally lying in spaced parallel planes normal to the plane of said mounting means, the elements of one of said layers being spaced and parallel with each other and with the plane of said mounting means from one end of the respective link member to the other and being in tension thereby resisting said lateral movement, the elements of the other of said layers being divided into two groups of spaced parallel elements, said groups respectively extending diagonally from one end of the respective link element to the other, said groups respectively crossing each other intermediate said ends and being in tension thereby resisting said axial movement.

15. Mounting apparatus for isolating rotational vibration of a motor including a stator member and a rotor member, while closely maintaining the lateral and axial position of the axis of rotation of said rotor member comprising: stationary mounting means disposed in a plane normal to said axis and surrounding the same; at least three elongated normally straight flat beam members each having a generally rectangular cross-section and opposite ends, said beam members respectively having one end connected to said stator member at symmetrically spaced intervals about said axis and normally extending generally radially outwardly therefrom, said beam members having their other ends connected to said mounting means, said beam members lying in planes normal to the plane of said mounting means, said beam members being formed of rubber-like material and being relatively flexible transversely, each of said beam members having a plurality of elongated strand-like reinforcing tension elements embedded therein and extending between the ends of the respective beam member, said elements being formed of relatively longitudinally stiff material and being in tension whereby said beam members are relatively stiff longitudinally thereby resisting lateral and axial movement of said stator member; a plurality of pins secured to said mounting beams and extending perpendicularly to the plane thereof; a plurality of pins secured to said stator member and extending parallel with said axis; and means connecting the opposite ends of each of said beam members to respective pins on said mounting means and stator member.

References Cited by the Examiner
UNITED STATES PATENTS

| | | | |
|---|---|---|---|
| 1,491,736 | 4/1924 | Polk | 230—273 |
| 1,676,333 | 7/1928 | Kattwinkel | 64—12 |
| 1,873,343 | 8/1932 | Seyfreid | 230—273 |
| 2,028,985 | 1/1936 | Mahan | 230—273 |
| 2,415,983 | 2/1947 | Yerzley | 248—18 |
| 2,728,541 | 12/1955 | Hansel | 230—273 |
| 2,987,242 | 6/1961 | Mazzacane | 230—273 |

DONLEY J. STOCKING, *Primary Examiner.*

LAURENCE V. EFNER, *Examiner.*